United States Patent [19]

Christensen

[11] Patent Number: 5,333,248

[45] Date of Patent: Jul. 26, 1994

[54] METHOD AND SYSTEM FOR THE SMOOTH CONTOURING OF TRIANGULATED SURFACES

[75] Inventor: Albert H. J. Christensen, Potomac, Md.

[73] Assignee: International Business Machines Corporation, Armonk, N.Y.

[21] Appl. No.: 914,689

[22] Filed: Jul. 15, 1992

[51] Int. Cl.$^5$ ............................................. G06F 15/62
[52] U.S. Cl. ................... 395/142; 395/120; 395/133; 395/141; 395/143
[58] Field of Search ............... 395/119, 120, 121, 123, 395/125, 140, 141, 155, 156, 129, 133, 139, 142, 143

[56] References Cited

U.S. PATENT DOCUMENTS

| | | | |
|---|---|---|---|
| 3,213,447 | 10/1965 | Burrows et al. | 343/7 |
| 4,620,287 | 10/1986 | Yam | 364/518 |
| 4,630,309 | 12/1986 | Karow | 382/56 |
| 4,706,199 | 11/1987 | Guerin | 364/460 |
| 4,742,473 | 5/1988 | Shugar et al. | 395/156 |
| 4,912,664 | 3/1990 | Weiss et al. | 395/123 X |
| 4,949,281 | 8/1990 | Hillenbrand et al. | 364/518 |
| 4,970,682 | 11/1990 | Beckwith, Jr. et al. | 364/900 |
| 4,976,035 | 12/1990 | Levy et al. | 33/1 |
| 4,999,789 | 3/1991 | Fiasconaro | 364/518 |

OTHER PUBLICATIONS

IBM Technical Disc. Bulletin vol. 15 No. 4, Sep. 1972, M. W. Blasgen et al. "Smoother".
IBM Technical Disc. Bulletin vol. 22 No. 4, Sep. 1979, A. Appel "Polyhedral Blending To Simulate Curved Surfaces".
IBM Technical Disc. Bulletin vol. 28 No. 7, Dec. 1985, K. C. Chu "Spline Function For Curve Fitting".

*Primary Examiner*—Heather R. Herndon
*Assistant Examiner*—Almis Jankus
*Attorney, Agent, or Firm*—Duke W. Yee; Andrew J. Dillon; Mark Walker

[57] ABSTRACT

A method and a system in a data processing system for differentially smoothing raw isolines containing linear segments within a triangular mesh which represents a single-valued surface. The triangulation mesh comprises a plurality of triangles. A first centroid is located for a first triangle within the triangular mesh and a second centroid is located for a second adjacent triangle within the triangular mesh which shows a common side with the first triangle. Each centroid includes three medians beginning at the centroid and terminating at one of three vertices of a triangle associated with the centroid. The common side between the two triangles has a first end point and a second end point, and an isoline which traverses the first and the second triangle traverses at least one of the three medians in each triangle. A first point is determined at an intersection of the isoline and a median within the first triangle. A second point is determined at an intersection of the isoline with a median within the second triangle. A third point is determined at an intersection of the isoline with the common side. The isoline is replaced within the triangle formed by the first point, the second point, and the third point with a selected curve, such as a pair of parabolic lines.

20 Claims, 11 Drawing Sheets

METHOD AND SYSTEM FOR THE SMOOTH CONTOURING OF TRIANGULATED SURFACES

BACKGROUND OF THE INVENTION

1. Technical Field

The present invention relates in general to a method and system for manipulating raw isolines associated with a triangular mesh representing a surface and in particular to a method and system for smoothing isolines associated with a triangular mesh to provide an isoline map. In the most representative application of the present invention, the surfaces are topographical and the isolines are called contours.

2. Description of the Related Art

Topographic surfaces are the visible sections of the Earth modelled from the reality by people, such as civil engineers, surveyors, cartographers, and Earth scientists. Today, these surfaces are modelled on computers, manipulated with algorithms and graphics systems, and analyzed in many different ways. In many computer applications, a topographic surface is usually represented by a uniform grid—much like a fishnet spread over the land or as a "triangulation" or "triangular mesh", which is a set of triangular facets covering a surface without overlapping each other (except for the case in which one area is made to overhang another).

Figure 1:
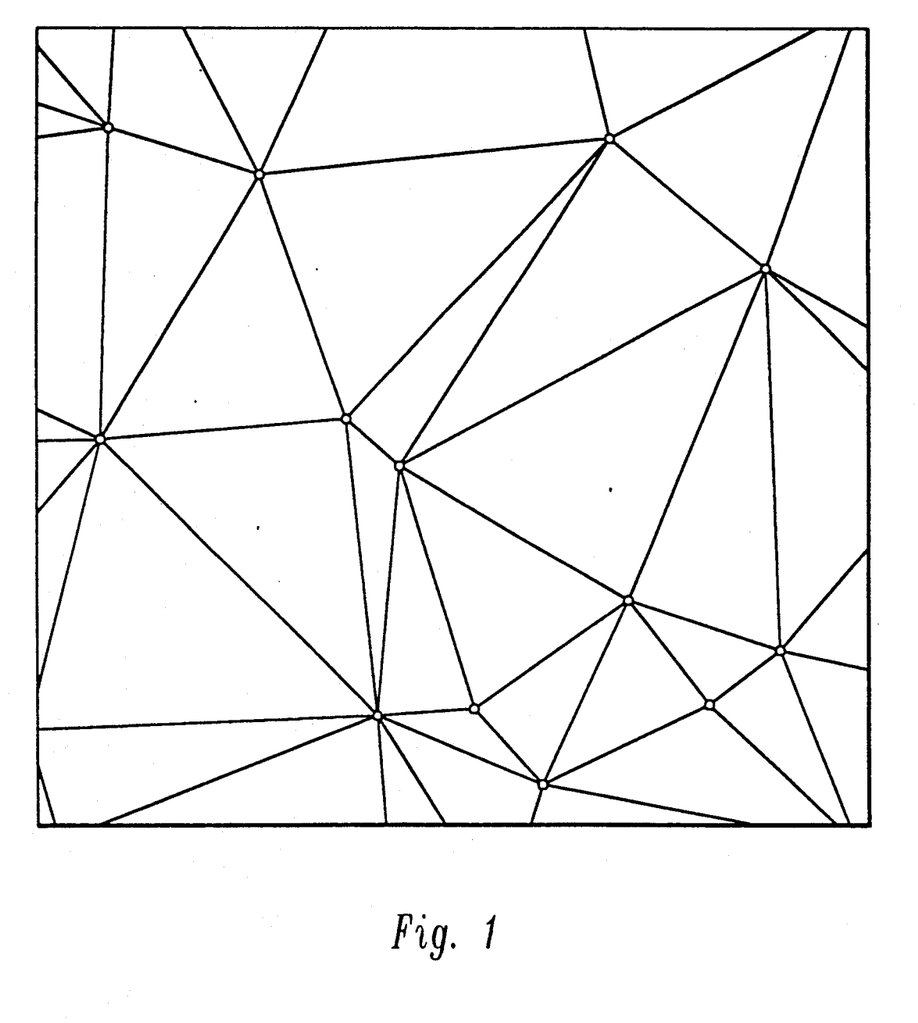
FIG. 1 depicts a small section of such a triangulation or triangular mesh representing a single valued surface.

An example of a triangulation or a triangular mesh is found in FIG. 1, which depicts a small section of such a triangulation or triangular mesh representing a topographic surface. Depending on the application, triangulations may have any number of elements, which may range, for example, from a few dozen to several millions.

Figure 2:
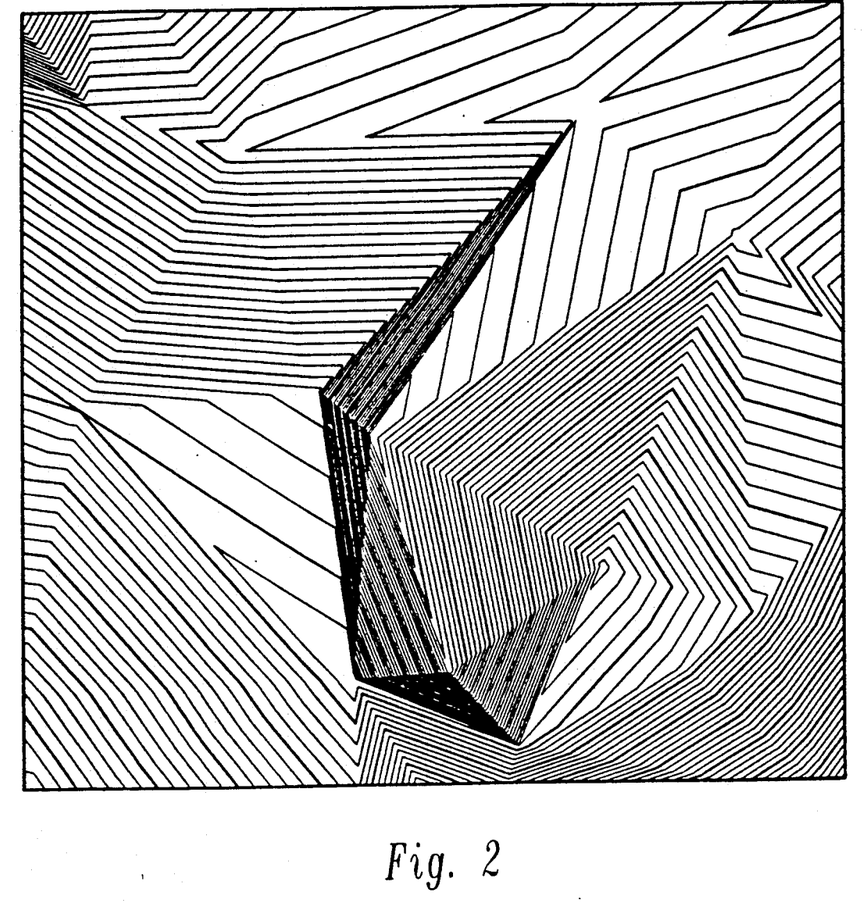
FIG. 2 is an illustration of the triangulation or triangular mesh depicted in FIG. 1 with raw isolines added.

Contouring is probably the most frequent of the many operations that may be performed on a triangulation. When applied to a topographic surface, the result of a contouring operation is a contour map. "Contours" are lines of constant height. Examples of contours may be seen in FIG. 2, which is an illustration of the triangulation or triangular mesh depicted in FIG. 1 with raw contours added. A more general term for contours is "isolines", which is a concept that has found acceptance in almost any scientific and technical discipline. In this disclosure, "isolines" or simply "lines" are indistinctly utilized. Maps of isolines are the preferred illustration in the analysis of geologic, climatic, magnetic, gravitational, etc., phenomena. In this more general context, isolines are lines of constant field value.

Referring again to FIG. 2, there is an example of the simplest form of an isoline map. The isolines are "raw" isolines, having highly angular successions of more or less short segments that change direction at the triangle edges. The greatest value of raw isolines, in this case raw contours, for surveyors and civil engineers, and other users concerned with representation accuracy, is the fidelity with which they honor or conform with the source data from which the contours are derived. In addition, raw isolines are an attractive proposition to both programmers and system managers because of the simplicity of the algorithms involved. Programs for raw isolines are easy to write and maps may be completed in a relatively short time.

Although isolines are frequently used to represent types of surface other than topographical, they are almost exclusively utilized for uniform functions of two variables, also called single-value functions and scalar and potential fields. A uniform function is one which yields a single value f for each coordinate pair x, y. For topographic surfaces, f represents the height of the surface. In this description, these surfaces are called "single valued surfaces."

Notwithstanding the simplicity and time efficiency involved with raw isolines, many users tend to reject maps containing only raw isolines, preferring isoline maps with a more natural look, maps in which the broken lines have been smoothed into curves resembling the product of traditional cartographers.

The objection to raw isolines is not grounded on esthetics only. Raw isolines, especially when densely packed, clearly show the underlying triangular structure from which they were derived. As a result, it is difficult for the user to ignore that structure when trying to understand the surface shape from raw isolines. On the other hand, smooth isolines help the user by effectively concealing the triangular structure underneath.

In an attempt to provide the smooth isolines desired by many users, two fundamentally different approaches have been utilized. The first approach, line interpolation, totally ignores the triangles in the triangulation or triangular mesh. The source data for this first approach are the raw isolines within the triangular mesh, or in a broader sense, any other type of broken lines. The lines are transformed into curves, one piece at a time, that blend smoothly into each other. The conversion of the raw isolines involves inserting extra points between the vertices of the raw isolines, computed by means of equations of different types. The sequence of extra points define the smoothed isoline.

In the second method, patch contouring, the raw isolines are ignored. This approach consists of fitting patches of curved surfaces over each triangle in a triangulation or triangular mesh. The patches on adjacent triangles are forced to blend more or less continuously into each other. The contouring proceeds on the patches rather than on the original triangles. Because the patches are curved, the resulting isolines are also curved.

Several problems exist with utilizing a line interpolation approach. First, the smoothed isolines generally do not accurately correspond to the original data points because the triangulated surface is not considered during the operation. The smoothed isolines may only correspond to the vertices of the raw isolines under a line interpolation approach.

Next, in the smoothing of one isoline, the other isolines are ignored under the line interpolation approach. This method may lead to the isoline being smoothed intersecting its neighbors. Such intersections are generally unacceptable, since two different function values (two heights in topographic maps) at the point of intersection would occur.

Figure 3A:
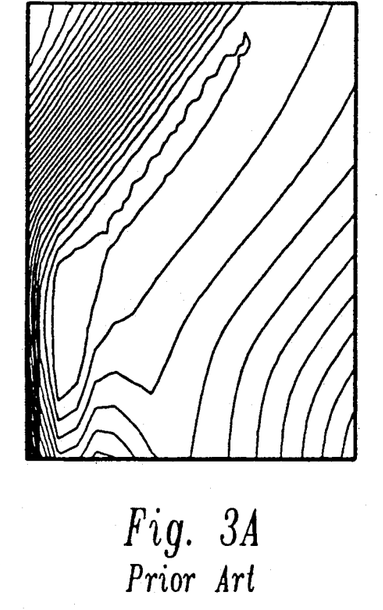
FIG. 3A depicts a section of the area depicted in FIG. 1 and FIG. 2 with the raw isolines smoothed with a fifth degree line interpolation program in the prior art.

In attempting to avoid the crossing of isolines, designers have often resorted to equations of degrees higher than quadratic. The penalty associated with this solution is usually an introduction of "fantasies" in the smoothed lines. "Fantasies" are undulations in the lines unwarranted by the source data. The higher the degree, the higher the potential for fantastic curves, which are curves containing fantasies. FIG. 3A depicts a section of the area shown in FIG. 1 and FIG. 2 with the isolines smoothed with a fifth degree line interpolation program. In addition to the undesirable effect of introducing fantasies, raising the degree in the curves above the quadratic also greatly increases program complexity, execution time, and computer storage requirements.

- Another inadequacy is the fact that in addition to isolines, other means of rendering surfaces exist, such as, for example, profiles or fishnets in perspective views of different geometries, and maps colored in continuous tones. Presently, no available commercial packages exist to smooth the surfaces, either for perspective views or for continuous tone maps, in a way consistent with the results of the line interpolation approach.

The patch contouring approach, like the line interpolation approach, also presents problems in smoothing isolines. The mathematics of rigorously fitting patches to any triangulation, without adopting unnatural shapes, is anything but elementary, and the design of algorithms is then anything but simple. Compared to what the raw isoline approach needs, the number of operations per triangle and isoline are enormous. Processing times are larger in the same ratio, and for dense isoline maps, processing times may be exorbitant. Data processing systems processing dozens of isoline maps per day are not uncommon. In such data processing systems, a complex smoothing procedure may not be acceptable. Any attempt to significantly reduce processing time requires large amounts of storage space. For example, the simplest patch fitting method requires a minimum storage of 12 extra coefficients per vertex, plus three coefficients per triangle, all of which quadruples the basic data storage requirements for raw contouring.

Furthermore, compared to the operation on flat triangles, the contouring of curved patches is a very complex task. In contouring awkward triangle configurations, frequently found in topographic applications, the patches may be forced to adopt convoluted shapes. The patches are the result of very complex expressions and may have more than a single local maximum or minimum. Then, if used directly and not as an intermediate data structure-as is explained next-, the patches will have to be exhaustively scanned in order to "thread" through them all possible isolines. In fact, this direct procedure is seldom, if ever, implemented in commercial packages. Instead, the patches are utilized to define an orthogonal grid of z-values at regular intervals on the x,y plane. This grid is then contoured, usually with programs specific for grids. The price, in terms of processing resources, demanded by this kind of contouring is proportional to the square of the number of grid elements, which must be added to the cost of the lengthy patch determination. All things considered, smooth patches and their contouring is a very costly exercise.

Furthermore, contouring by means of an intermediate grid may result on misrepresentations of the surface. Contrary to what happens in directly contouring a triangulation, the contouring of these grids does not necessarily ensure that all the features in the smoothed surfaces are shown in the resulting map: features smaller than the grid interval may be ignored. A consequence of this shortcoming is that the original data points, unless they coincide with grid intersections, may not be exactly honored by the grid isolines. Not surprisingly, very few commercial products for the Earth Sciences offers this kind of smoothing capability.

In the case of topographic mapping, the obstacles to the smoothing of isolines mentioned above are compounded by an additional requirement. Today's users prefer to establish some distinctions among the edges of the triangulation, which later, at contouring time, should translate as variable degrees of smoothing along different segments of the same contour. For example, a contour should not be smoothed at or near a retention wall. A contour crossing a glacial valley (with rounded shaped floor) should be smoothed to a higher degree than the contour crossing a mountain river valley (with a v-shaped floor). Similar considerations can be made in connection with geologic mapping and the existence of surface or subsurface discontinuities, such as faults.

Therefore, it would be desirable to have a method and a system for accurately smoothing raw isolines within a triangular mesh without the shortcomings of the two approaches described above.

SUMMARY OF THE INVENTION

It is therefore one object of the present invention to provide a method and system for manipulating raw isolines associated with a triangular mesh representing a single valued surface. In particular, raw contours associated with a triangular mesh approximating a topographical surface.

It is another object of the present invention to provide a method and system for smoothing raw isolines associated with a triangular mesh.

It is yet another object of the present invention to provide a method and system for smoothing raw isolines associated with a triangular mesh to provide an isoline map.

The foregoing objects are achieved as is now described. The present invention provides a method and a system in a data processing system for differentially smoothing raw isolines containing linear segments within a triangular mesh which represents a single valued surface. The triangular mesh comprises a plurality of triangles. A first centroid is located for a first triangle within the triangular mesh and a second centroid is located for a second adjacent triangle within the triangular mesh which shows a common side with the first triangle. Each centroid includes three medians beginning at the centroid and terminating at one of three vertices of a triangle associated with the centroid. The common side between the two triangles has a first end point and a second end point, and an isoline which traverses the first and the second triangle traverses at least one of the three medians in each triangle. A first point is determined at an intersection of the isoline and a median within the first triangle. A second point is determined at an intersection of the isoline with a median within the second triangle. A third point is determined at an intersection of the isoline with the common side. The isoline is replaced within the triangle formed by the first point, the second point, and the third point with a selected curve, such as one made with a pair of parabolic lines.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 4:
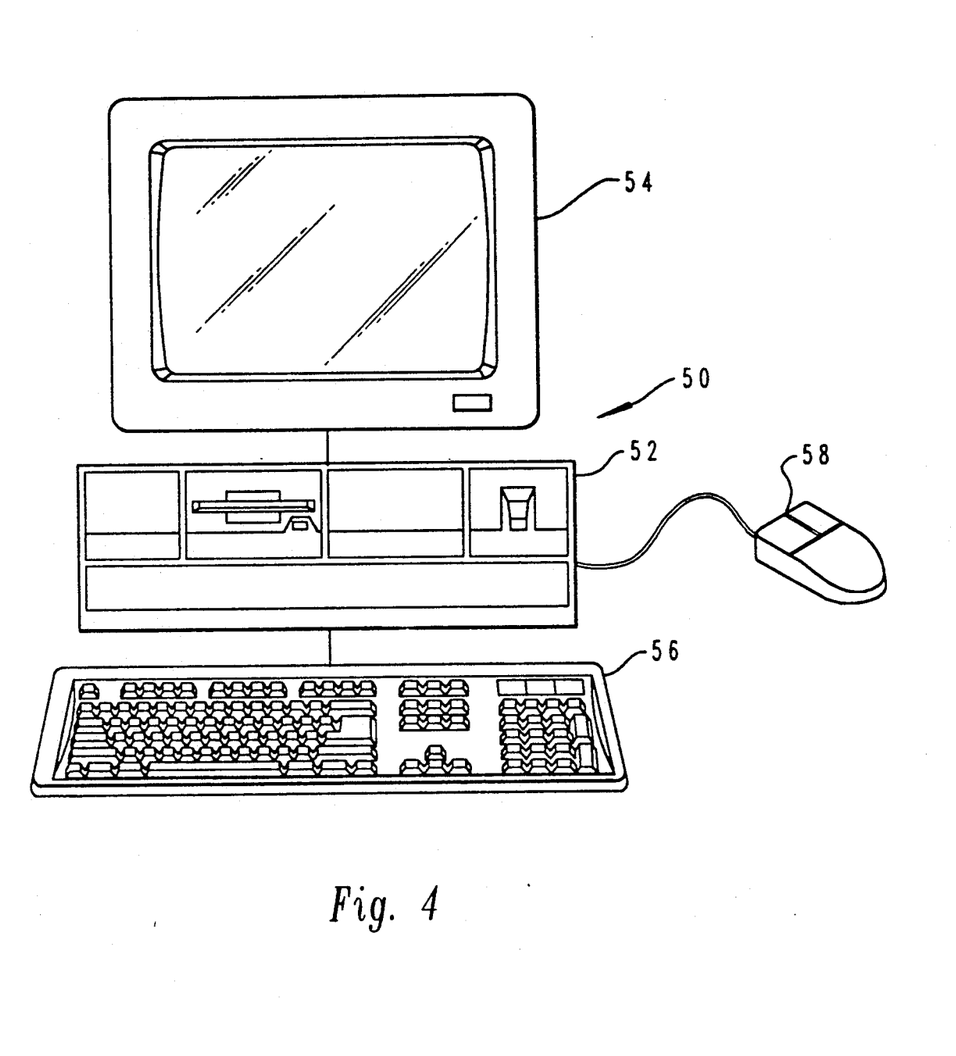
FIG. 4 is a pictorial representation of a data processing system in which the present invention may be implemented in accordance with a preferred embodiment of the present invention.

With reference now to the figures and in particular with reference to FIG. 4, there is depicted a pictorial representation of a data processing system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as the IBM PS/2 computer, a product of International Business Machines Corporation. PS/2 is also a registered trademark of International Business Machines Corporation. Although the depicted embodiment illustrates a personal computer, a preferred embodiment of the present invention may be implemented in other types of data processing systems, such as for example, intelligent work stations or mini-computers.

Figure 5:
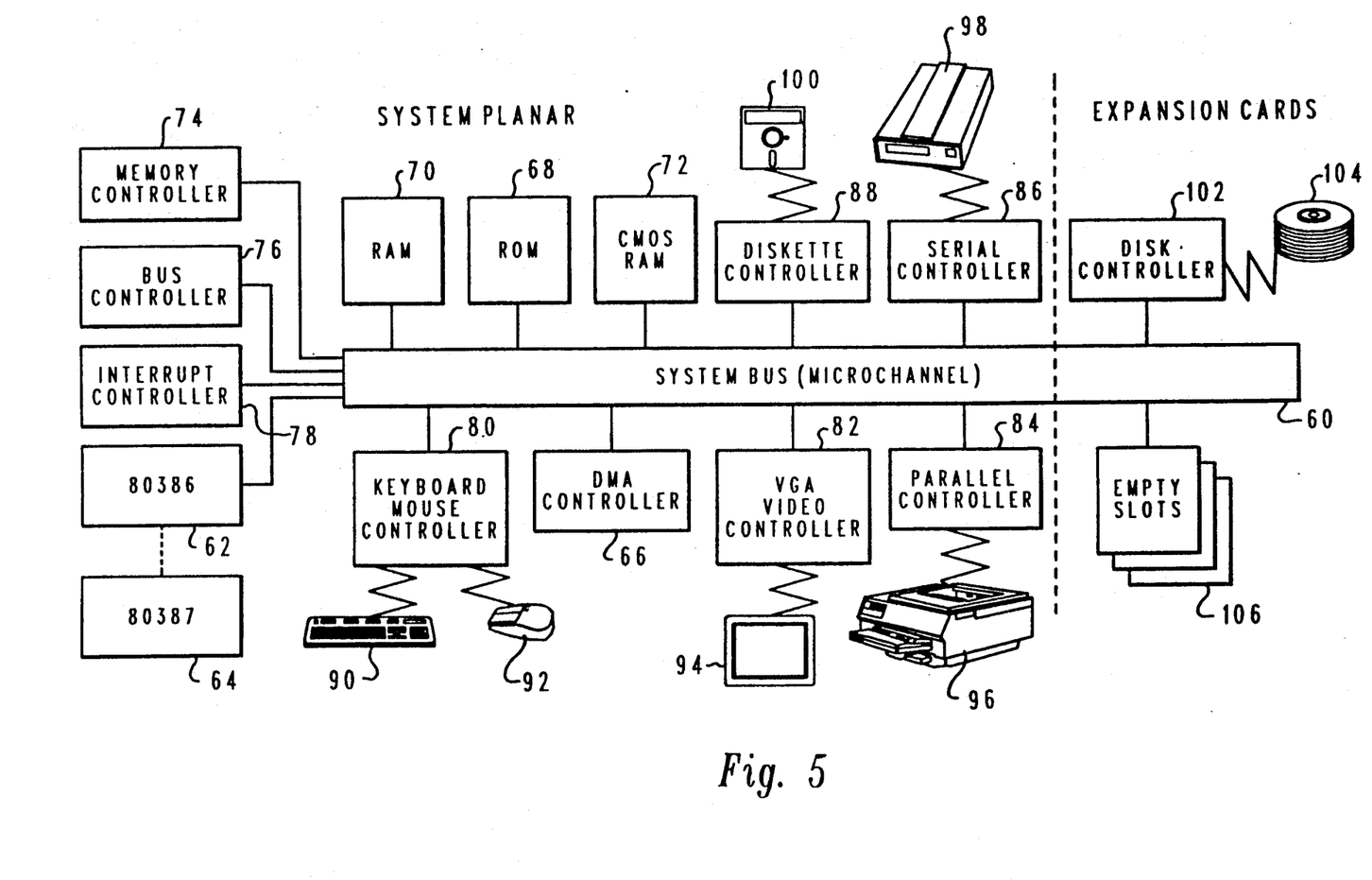
FIG. 5 depicts a block diagram of selected components in a personal computer in which a preferred embodiment of the present invention may be implemented.

Referring now to FIG. 5, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and may also have numeric coprocessor 64 connected to it. DMA controller 66 is also connected to system bus 60 and allows various devices to appropriate cycles from microprocessor 62 during large I/O transfers.

Read only memory ("ROM") 68 is mapped into the microprocessor 62 address space in the range from 640K to 1 megabyte. Read Only Memory ("ROM") 68 and Random Access Memory ("RAM") 70 are also connected to system bus 60. ROM 68 contains the power-on self test ("POST") and the Basic Input/Output System ("BIOS") which control hardware operations, such as those involving disk drives and the keyboard. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input-/output ("I/O") controllers such as: keyboard and mouse controller 80, video controller 82, parallel controller 84, serial controller 86, and diskette controller 88. Keyboard and mouse controller 80 provides a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards may also be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 5 may vary for specific applications. For example, other peripheral devices such as: pen or electrostatic plotters, optical disk media, audio adapters, or chip programming devices such as a PAL or EPROM programming device, and the like may also be utilized in addition to or in place of the hardware already depicted.

The depicted data processing system, personal computer 50, may be utilized to analyze and manipulate data representing isolines associated with a triangular grid representing a surface in accordance with a preferred embodiment of the present invention.

The following are definitions and examples illustrating how various terms are utilized in describing a preferred embodiment of the present invention:

Vertices and points are represented by an upper case letter; $P_1$.

Triangle edges and line segments are represented by vertices (points) separated by dashes or a lower case letter; $P_1\text{-}P_2 = a_3$.

Angle at point (vertex) i between line segments k,j is symbolized as two line segments separated by a comma or three vertices separated by commas, with point (vertex) in the middle; angle alpha $= P_1\text{-}P_3$, $P_1\text{-}P_2$, or angle alpha $= a_1, a_2$.

An initial angle ("$I_a$") is the convex angle on a line at the intersection with a triangle edge; $I_a = A_2\text{-}A_1, A_2\text{-}A_3$.

A triangle may be characterized by a list of vertices or edges separated by semicolons; $P_1;P_2;P_3$.

A median of an edge in a triangle is a line segment defined by the midpoint of the edge and the opposite vertex.

A centroid of a triangle is the intersection of three medians of the triangle.

Midpoint of a line segment (edge), i.e., M23, is shown by a lower case m followed by the line segment (edge) within parenthesis; $M23=m(A_2-A_3)$ or $M23=m(a_1)$ Lines are named with two lower case characters, loosely signaling the beginning and end of the line, separated by a colon; $p:q=x_1,y_1,x_2,y_2, \ldots x_i,y_i, \ldots x_n,y_n$.

Pairs are represented by two line segments separated by a dash, or three vertices (points) in sequence separated by dashes; $pair=q_3-q_2$, $pair=A_1-B_1-C_1$.

A central vertex of a pair is the middle vertex (point) of a pair; $B_1$ is the central vertex in pair $A_1-B_1-C_1$.

Coordinates of a point (vertex) are represented by an axis denomination followed by a point (vertex) denomination in between parenthesis; $x(M_1)$, $y(M_1)$ or by the axis denomination with a subscript index; $Y_3$ The sub-triangle of a triangle edge is formed by the triangle centroid, i.e., $CN_1$, and the opposite edge; $P_3-P_1$.

In accordance with a preferred embodiment of the present invention, repetition of a geometric operation, involving the determination of a line segment midpoint, is employed. This operation is iterated until the desired smoothing of the isolines is achieved.

The process may be described as the approximation of a quadratic parabola by means of tangents in accordance with a preferred embodiment of the present invention. Contrary to the prior approaches, a preferred embodiment of the present invention may reach the approximation without resorting to an explicit equation. The limited resources put to work result in processing times very similar to the minimum amount of time possible when generating raw isolines in accordance with a preferred embodiment of the present invention.

Figure 6:
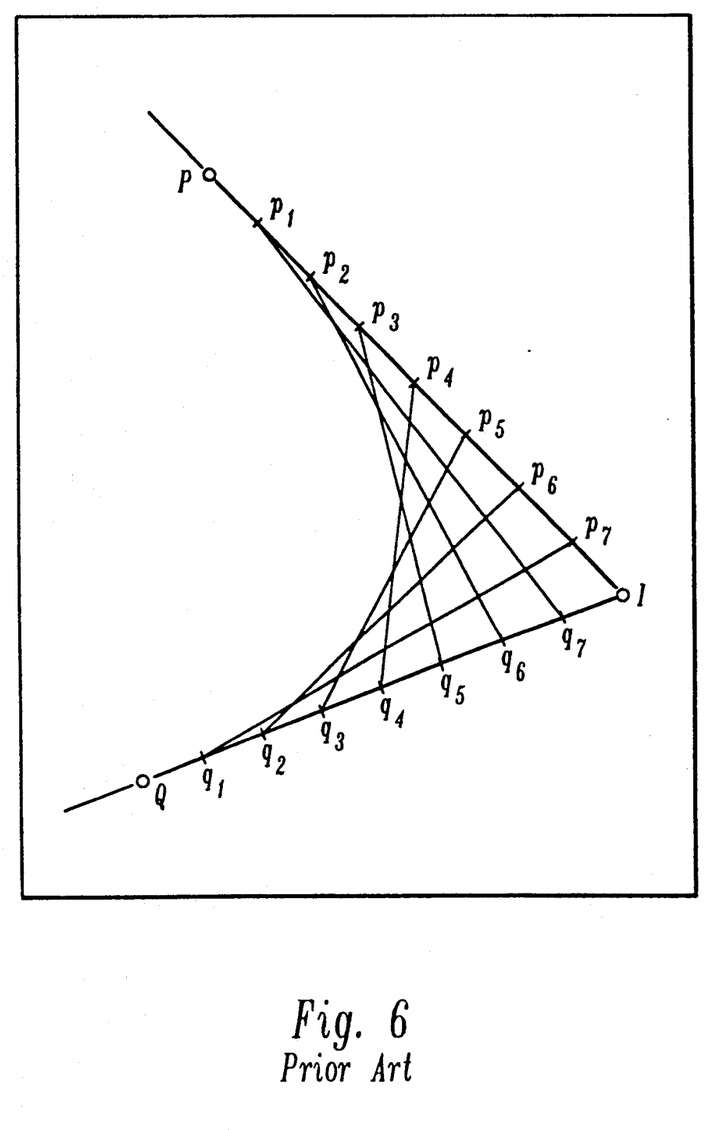
FIG. 6 is a graph of two tangents and the tangent points involved in approximating a parabola produced in accordance with a traditional method in the prior art.

The procedure utilized for stroking a parabola is similar to one found in projective geometry textbooks and in some engineering manuals, where it is recommended for the fast fairing of sharp corners. Fairing is the smooth blending of two or more surfaces at their edges or corners, for aesthetic or technical (usually to reduce drag) reasons. With reference to FIG. 6 there is depicted a graph of two tangents and the tangent points involved in approximating a parabola produced in accordance with a traditional method in the prior art. A traditional projective geometry method for constructing a parabola that starts from two tangents to the curve p and q that intersect each other in point I, and the points of tangency P and Q involves line segments I-P and I-Q, which are divided into n equal line segments each. Then, two sets of points are defined:

on p: $p_1, p_2, p_3, \ldots p_{n-2}, p_{n-1}$ on q: $q_1, q_2, q_3, \ldots q_{n-2}, q_{n-1}$ The parabola is the envelope of the (n−1) tangents: $t_i=p_i-p_j$, $(i=1,n-1; j=n-i)$. Although the tangents are very good for fairing the curve for a draftsman, the tangents are very bad for data processing systems. A "stroking" of the curve is needed instead. A "stroking" is an ordered list of points on the curve. To obtain them from the tangents, a data processing system would have to intersect each $t_i$ with $t_{i-1}$ and $t_{i+1}$. For every tangent $t_i$, one intersection point $t_{ij}$ could thus be obtained. As an approximation to the stroking, the data processing system would then obtain the midpoints of the segments defined by each pair $t_{ij},t_{ij+1}$.

A method and system, in accordance with a preferred embodiment of the present invention of the present invention, provides an improved process for stroking because one average is needed per points, instead of the intersection per point needed in the projective geometry method. The approximations to the parabolas are strung together along the original raw contour, sharing common tangents at their ends, with each other and with the raw contour.

Figure 7:
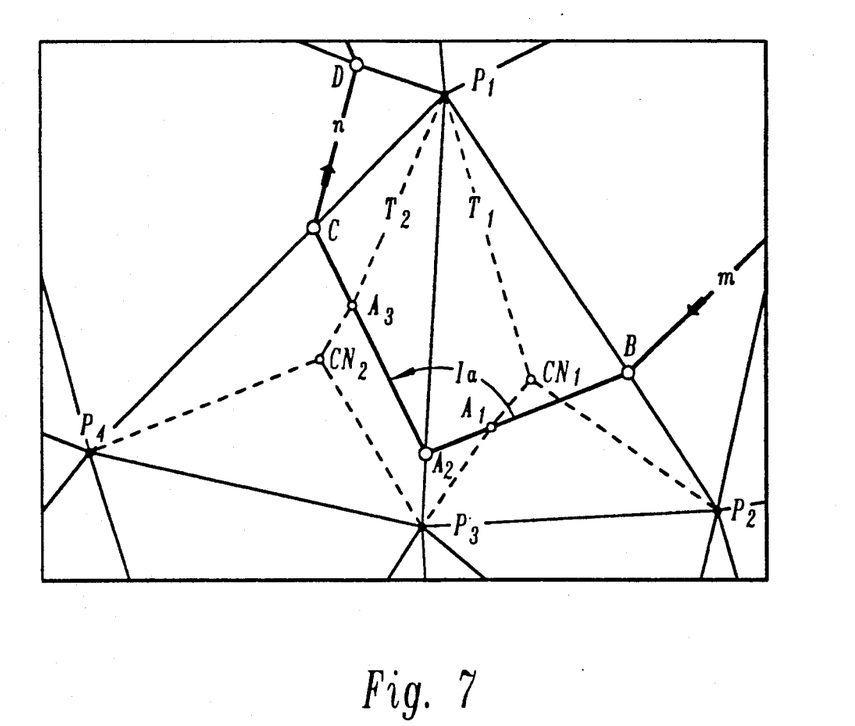
FIG. 7 depicts a small section in a triangular mesh with a raw isoline illustrating elements utilized for smoothing raw isolines in accordance with a preferred embodiment of the present invention.

Referring now to FIG. 7, there is depicted a triangular mesh with a raw isoline illustrating elements utilized for smoothing the raw isolines in accordance with a preferred embodiment of the present invention. The smoothing of isolines may be executed over a set of n non-overlapping triangles $T_i=P_j,P_k,P_l$, $i=1,n$,$\{j, k, l=1,m; j\neq k; j\neq l; k\neq l\}$ with m distinct vertices P. A known numerical function f is associated with each vertex P. Lines at constant f are called isolines. The isolines to be smoothed are linear interpolations over the triangles and consequently may be represented by chains of straight line segments. In general, these line segments change orientation at the triangles edges that they intersect. An isoline m:n is described by its constant value of function f, by the number of its vertices, and by the orderly succession of the x;y coordinates of its vertices P. FIG. 7 also depicts a section of a linearly interpolated isoline m:n with vertices ..., B,A$_2$,C,D, .. . listed in that order.

Smoothing of isolines may be achieved angle by angle in accordance with a preferred embodiment of the present invention. Referring again to FIG. 7, a method and system of the present invention may be applied to angles $I_a$ in a line m:n. The application of a method and system of the present invention on an angle may proceed independently of the other angles in the line. For example, let $I_a=B-A_2,A_2-C$ be the angle to be smoothed utilizing a preferred embodiment of the present invention. This is equivalent to saying that $P_1-P_3$, shared by triangles $P_1;P_2;P_3$ and $P_1;P_3;P_4$, is the edge to be smoothed. At both sides of $P_1-P_3$ are two sub-triangles $CN_1;P_1:P_3$ and $CN_2;P_1;P_3$.

$P_1-P_3$ is known to intersect line n:m, represented in FIG. 7 by bold traces and arrows indicating its listing sequence. Line m:n may be smoothed in sections delimited by the medians at both sides of each triangle edge $P_j-P_k$. In other words, the range for each independent smoothing operation is the pair of adjacent sub-triangles crossed by m:n. The smoothing corresponding to edge $P_1-P_3$, in the case illustrated, starts at point $A_1$ and ends at point $A_3$. Point $A_2$ is the intersection of m:n with $P_1-P_3$. The whole extent of m:n is smoothed in the same manner explained here for edge $P_1-P_3$, at all the angles m:n makes at its intersections with triangle edges.

Figure 8:
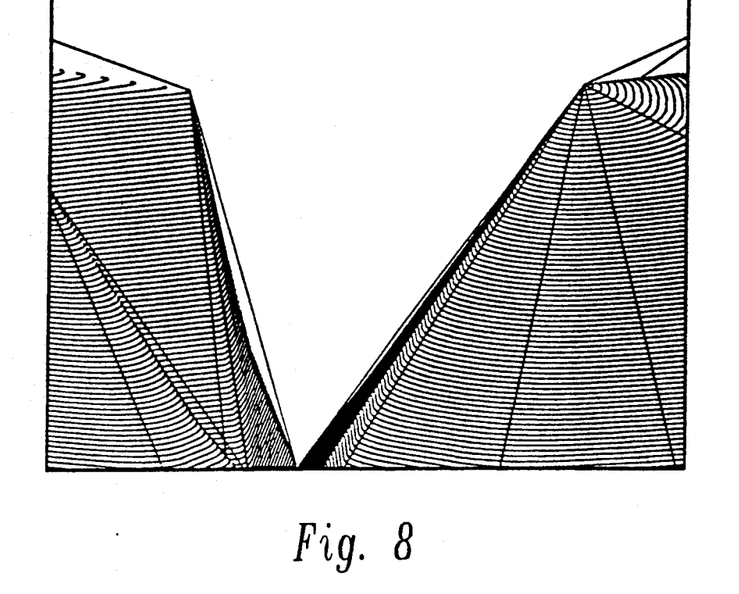
FIG. 8 is an isometric view of a section of a triangular mesh with raw isolines smoothed in accordance with a preferred embodiment of the present invention.

A section of m:n between two medians is said "to correspond" to the triangle edge between the medians. "Smoothing a section of isoline", "Smoothing an angle", and "smoothing an edge" are all equivalent expressions and as such are indistinctly used here. "Smoothing an angle" refers to the angle ($I_a$ in FIG. 7) formed by the two segments of the section at their intersection with a triangle edge (i.e., $P_1-P_3$ in FIG. 7.) "Smoothing an edge" refers to this triangle edge and applies to the triangulated surface rather than to the isoline map. Smoothed triangulation edges are shown in FIG. 8, which depicts an isometric view of a triangular mesh with the isolines smoothed in accordance with a preferred embodiment of the present invention.

Any raw isoline that intersects $P_j$-$P_k$ must cross a sub-triangle $CN_i P_j P_k$. It is possible then to merge the two sub-triangles at both sides of $P_j$-$P_k$ into the framework for the smoothing of the isoline section contained therein.

A pair of line segments such as $A_i$-$B_i$-$C_i$ is referred to simply as a "pair". The pairs are the basic entities for smoothing and their elements, depending on what stage a method and system in accordance with a preferred embodiment of the present invention is operating may be, for example, any of the following: (1) line segments of the original raw isoline, (2) subdivisions of other pairs, (3) line segments of the final parabolic approximation.

The shape of the pair under process is utilized to monitor and control the smoothing. Pairs are kept in a data structure called a "Pairs Stack" or "Stack", from which the last pair "stacked" is also the first pair accessible ("last in, first out"). It is always possible to determine whether any more pairs exist in the Pairs Stack.

Figure 9:
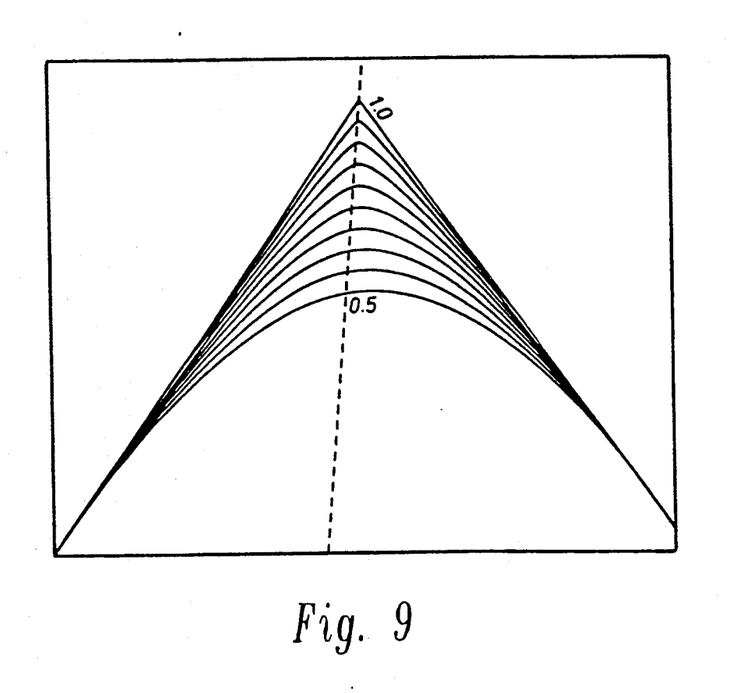
FIG. 9 depicts an illustration of the various lines obtained for various values of FAC between 0.5 and 1.0.

In accordance with a preferred embodiment of the present invention, the amount of smoothing of the isolines may be varied. The smoothing effect may be controlled by a parameter that can take any value between 0.5 and 1.0, FAC. The maximum smoothing effect may be accomplished by setting FAC equal to 0.5. For minimum smoothing, FAC may be set equal to 1. The values between 0.5 and 1.0 yield variable degrees of smoothing between the extremes. Referring now to FIG. 9, there is depicted an illustration of the various lines obtained for various values of FAC between 0.5 and 1.0.

Before smoothing of the isolines begins, all of the triangles are scanned, and for each triangle $P_i$-$P_j$-$P_k$, the shortest edge $K = P_i$-$P_j$ is determined. Let $H = |H_i$-$H_j|$ be the difference in isoline values (heights if the isolines are topographic contours), and let DH be the difference in isoline values between adjacent isolines (contour interval if the isolines are topographic contours).

Next, if for triangle N alpha=$P_k$-$P_j$, $P_k$-$P_i$<MinAng, where MinAng may be a user specified minimum angle, and H/DH>1, edge K in triangle N is flagged as unsuitable for smoothing. Consequently, by flagging such edges, the possibilities of contours intersecting each other may be avoided.

Additionally, before smoothing an isoline some initial parameters should be determined. For example, let the section of line m:n centered in vertex $A_2$, in FIG. 7, be the subject of smoothing, where: (1) edge $P_1$-$P_3$ is shared by triangles $T_1 = P_1;P_2;P_3$ and $T_2 = P_1;P_3;P_4$; (2) $A_2$ is interior to $P_1$-$P_3$; (3) $CN_1$=centroid of $T_1$; (4)$CN_2$=centroid of $T_2$; (5) $PS_1 \epsilon \{P_1,P_3\}$ so that $PS_1$-$CN_1$ intersects m:n in $A_1$ (in FIG. 7, $PS_1 = P_3$); and (6) $PS_2 \epsilon \{P_1,P_3\}$ so that $PS_2$-$CN_2$ intersects m:n in $A_3$ (in FIG. 7, $PS_1 = P_1$). Assuming $A_1$ and/or $A_3$ do not coincide with $P_1$ and/or $P_3$, smoothing of $A_1$-$A_2$-$A_3$ may occur.

Figure 10A:
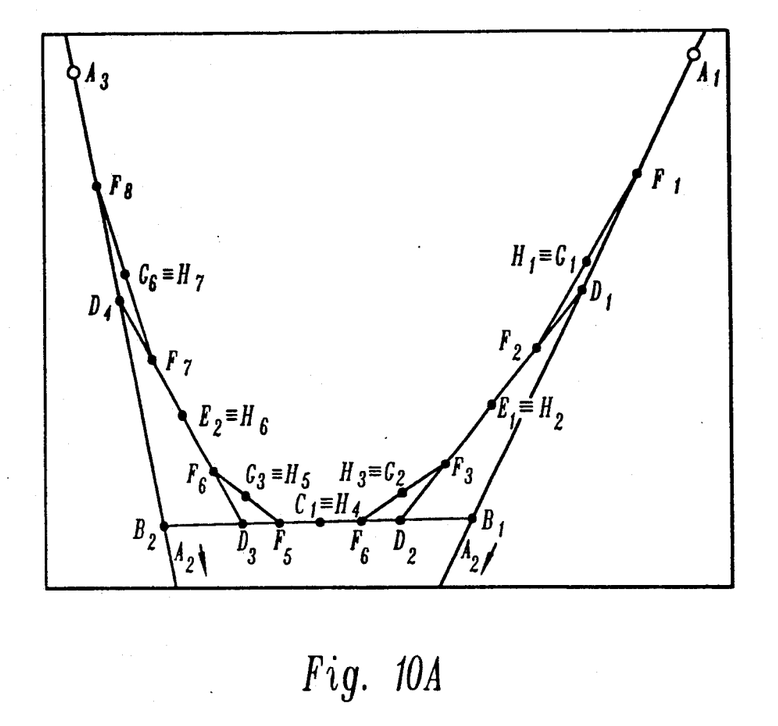
FIG. 10A is a view of the various points determined in accordance with a preferred embodiment of the present invention to approximate the parabolic lines.
Figure 10B:
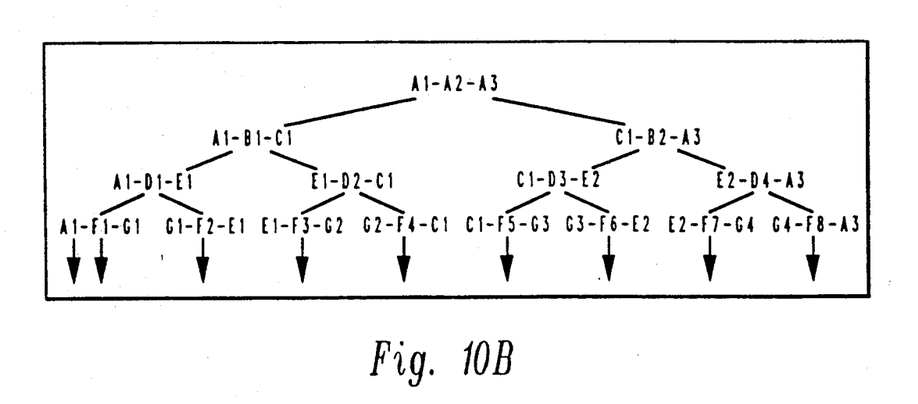
FIG. 10B depicts a tree of the pairs generated, in accordance with a preferred embodiment of the present invention, with the arrows designating points utilized as points on the tangents to the parabolic lines.

With reference now to FIG. 10A, there is depicted a view of the various points determined in accordance with a preferred embodiment of the present invention to approximate the parabolic lines, while FIG. 10B depicts a tree of the pairs generated, in accordance with a preferred embodiment of the present invention, with the arrows designating points utilized as points on the tangents to the parabolic lines.

In accordance with a preferred embodiment of the present invention, a list of vertices F is generated. A pair of consecutive points $F_i$-$F_{i+1}$ determines a tangent to the parabolic lines originating from point $C_1$.

A pair considered for subdivision is called the "Current Pair" ("CP"). The pair that is divided is called the "parent". The pairs resulting from the division are the "children". The "left" child or "left" pair ("LP") is the one containing the first vertex of its parent. The other is the "right" pair ("RP"), and contains the last vertex of its parent. In the subdivision illustrated in FIG. 12, $LP = A_i$-$M_1$-$M_2$ and $RP = M_2$-$M_3$-$C_i$.

A pair $A_i$-$B_i$-$C_i$, in accordance with a preferred embodiment of the present invention, may be subdivided if any of the two following conditions are met:

1. the shortest of its two line segments is greater than a user-specified linear resolution Ires:

$$s = \text{MIN}(|A_i\text{-}B_i|, |B_i\text{-}C_i|) > \text{Ires}$$

2. the angle $A_i$-$B_i$,$B_i$-$C_i$ is less than a user-specified angular value lang:

$$\text{alpha} = A_i\text{-}B_i, B_i\text{-}C_i < \text{lang}$$

If a pair is not subdivided, its central vertex may be captured as part of the smoothed line.

Figure 11:
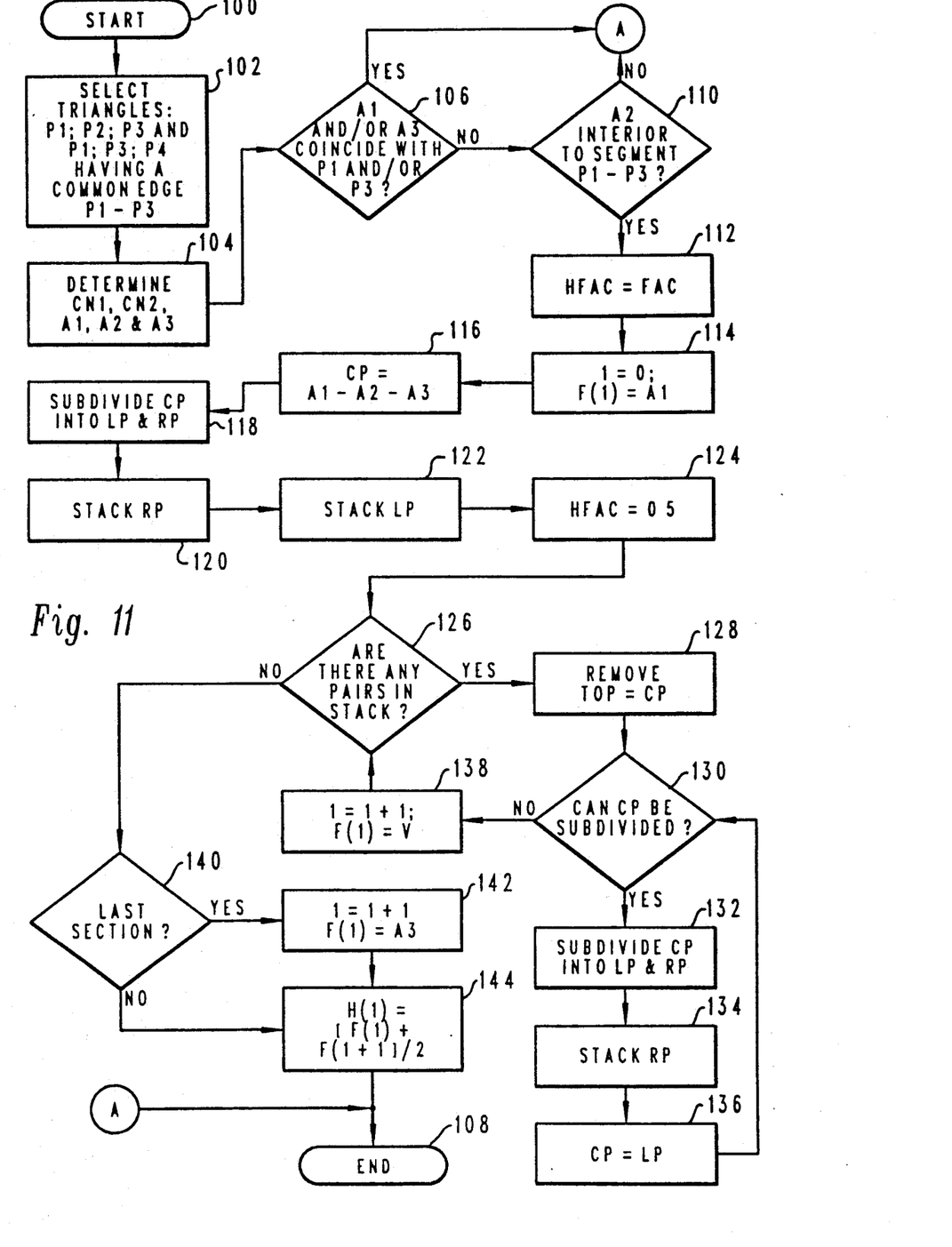
FIG. 11 is a high level flowchart of a method and system for smoothing an isoline in accordance with a preferred embodiment of the present invention.

Referring now to FIG. 11, there is depicted a high level flowchart of a method and system for smoothing a isoline in accordance with a preferred embodiment of the present invention. This process may be utilized to replace a section of isoline m:n between points $A_1$ and $A_3$ by an approximation to a parabolic line. This process is one procedure among the several that may be designed to complement the disclosed invention with the stroking of two parabolic lines. The process begins as illustrated in block 100, and thereafter proceeds to block 102, which depicts the selection of a pair of triangles $P_1;P_2;P_3$ and $P_1;P_3;P_4$ through which the raw isoline traverses, wherein the triangles have a common edge $P_1$-$P_3$. Then, the process proceeds to begin the smoothing of the isoline m:n in correspondence with edge $P_1$-$P_3$ by a determination of the centroids $CN_1$ and $CN_2$, and points $A_1$, $A_2$, and $A_3$, as illustrated in block 104. Point $A_1$ will be the starting point of the smoothed section for edge $P_1$-$P_3$, and $A_3$ will be end point of the smoothed section. Thereafter, the process proceeds to block 106, which depicts a determination of whether or not $A_1$ and/or $A_3$ coincide with $P_1$ and/or $P_3$. If $A_1$ and/or $A_3$ coincide with $P_1$ and/or $P_3$, the process terminates as illustrated in block 108 via connector A.

Referring back to block 106, if $A_1$ and/or $A_3$ do not coincide with $P_1$ and/or $P_3$, the process proceeds to block 110, which depicts a determination of whether or not $A_2$ is interior to line segment $P_1$-$P_3$. If $A_2$ is not interior to line segment $P_1$-$P_3$, the process terminates as illustrated in block 108 via connector A. Termination of the process in blocks 106 and 110 results in $A_2$, the central vertex, being made as part of the resulting line. If $A_2$ is interior to $P_1$-$P_3$, the process proceeds to block 112, which depicts setting HFAC equal to FAC. The process next proceeds to block 114, which illustrates the setting of the counter, i, equal to zero and the saving of $A_1$ as the first point in the F list; F(0)is equal to $A_1$. Thereafter, the process proceeds to block 116, which depicts setting the Current Pair ("CP"), equal to $A_1$-$A_2$-

$A_3$. The process then proceeds to block 118, which illustrates the subdivision of the CP into Left Pair ("LP") and Right Pair ("RP"). Next, the process advances to block 120, which depicts the stacking or saving of RP into a data structure called the "Pairs Stack" or simply called "Stack". The process then proceeds to block 122, which illustrates the stacking of the LP in the Pairs Stack. Thereafter the process moves on to block 124, which depicts setting HFAC equal t 0.5.

Afterwards, the process proceeds to block 126, which illustrates a query to the Stack to determine whether or not any more pairs are left in the Stack. If more pairs are present in the Stack, the process then proceeds to block 128, which depicts the removing of the pair found at the top of the stack and setting the removed pair equal to CP for further processing. Thereafter the process proceeds to block 130, which illustrates a determination of whether or not the CP can be subdivided further. If the CP can be subdivided, the process then continues to block 132, which depicts subdividing CP in to a LP and a RP. Afterwards, the process proceeds to block 134, which illustrates the stacking of the RP into the Stack. Subsequently, the process proceeds to block 136, which depicts the setting of CP equal to LP. Thereafter the process returns to block 130.

Referring back to block 130, if the CP cannot be divided, the process then proceeds to block 138, which illustrates the incrementing of the counter, i, by 1 and setting F(i) equal to V, the central vertex, of the CP. Afterwards, the process returns to block 126, which depicts the previously described determination of whether or not any pairs are present in the Stack. If no pairs remain in the Stack, the process then proceeds to block 140, which illustrates a determination of whether or not the section being processed is the last section of the isoline. If the section is the last section of the isoline, the process then proceeds to block 142, which depicts incrementing the counter, i, by one and setting F(i) equal to $A_3$, the last vertex of smoothed section. Thereafter the process proceeds to block 144, which illustrates the setting H(i) equal to an average of the consecutive points F(i) and F(i+1). In other words, the pairs of consecutive points F are averaged to obtain points H on the parabola. (See FIG. 10A): H(i)=m(F(i)--F(i+1)). As a result, the points H on the parabolas have been determined and the process terminates as illustrated in block 108. Referring back to block 140, if the section of the isoline being processed is not the last section, the process then proceeds directly to block 144 bypassing block 142.

Figure 12:
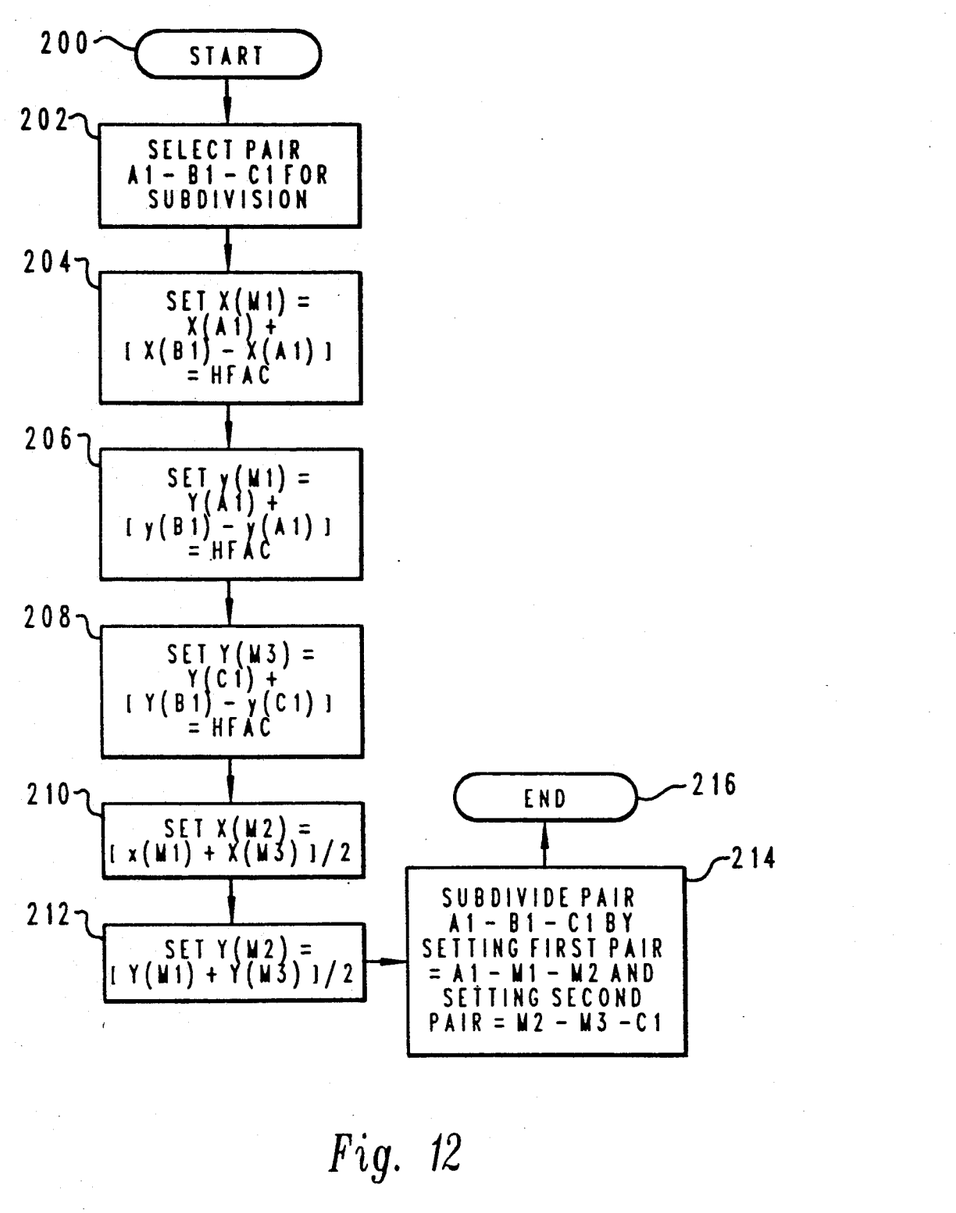
FIG. 12 depicts a high level flowchart of a method and system for subdividing a pair in accordance with a preferred embodiment of the present invention.

Referring now to FIG. 12, there is depicted a high level flowchart of a method and system for subdividing a pair in accordance with a preferred embodiment of the present invention. The process begins as illustrated in block 200, and thereafter proceeds to block 202, which depicts selecting an angle $A_i$-$B_i$-$C_i$ for subdivision. Pair $A_i$-$B_i$-$C_i$ may be subdivided into two pairs $A_i$-$M_1$-$M_2$ and $M_2$-$M_3$-$C_i$. Next, the process proceeds to block 204, which illustrates setting the x coordinate of $M_1$ equal to $x(A_i)+[x(B_i)-x(A_i)]*$ HFAC. HFAC is set equal to the smoothing factor, FAC, where HFAC $\epsilon$ {FAC,0.5}. Thereafter, the process proceeds to block 206, which depicts setting the y coordinate of $M_1$ equal to $y(A_i)+[y(B_i)-y(A_i)]*$ HFAC. The process then proceeds to block 208, which illustrates setting the x coordinate of $M_3$ equal to $x(C_i)+[x(B_i)-x(C_i)]*$ HFAC. Afterwards the process proceeds to block 210, which depicts setting the y coordinate of $M_3$ equal to $y(C_i)+[y(B_i)-y(C_i)]*$ HFAC Next, the process proceeds to block 212, which illustrates a determination of the midpoint $M_2$ of line segment $M_1$-$M_3$ is determined by averaging the coordinates of the line segment endpoints: $M_2=m(M_1,M_3)$, where $x(M_2)=[x(M_1)+x(M_3)]/2$ and $y(M_2)=[y(M_1)+y(M_3)]/2$. Next, $A_i$-$B_i$-$C_i$ is subdivided by setting $A_i$-$M_1$-$M_2$ as the first subdivided pair and $M_2$-$M_3$-$C_i$ is set as the second pair resulting from the division. Thereafter the process terminates as depicted in block 214.

Figure 3B:
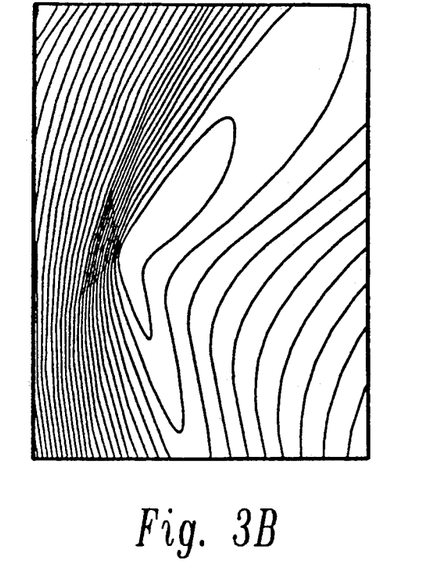
FIG. 3B depicts a section of the area depicted in FIG. 1 and FIG. 2 with the raw isolines smoothed in accordance with a preferred embodiment of the present invention.
Figure 13:
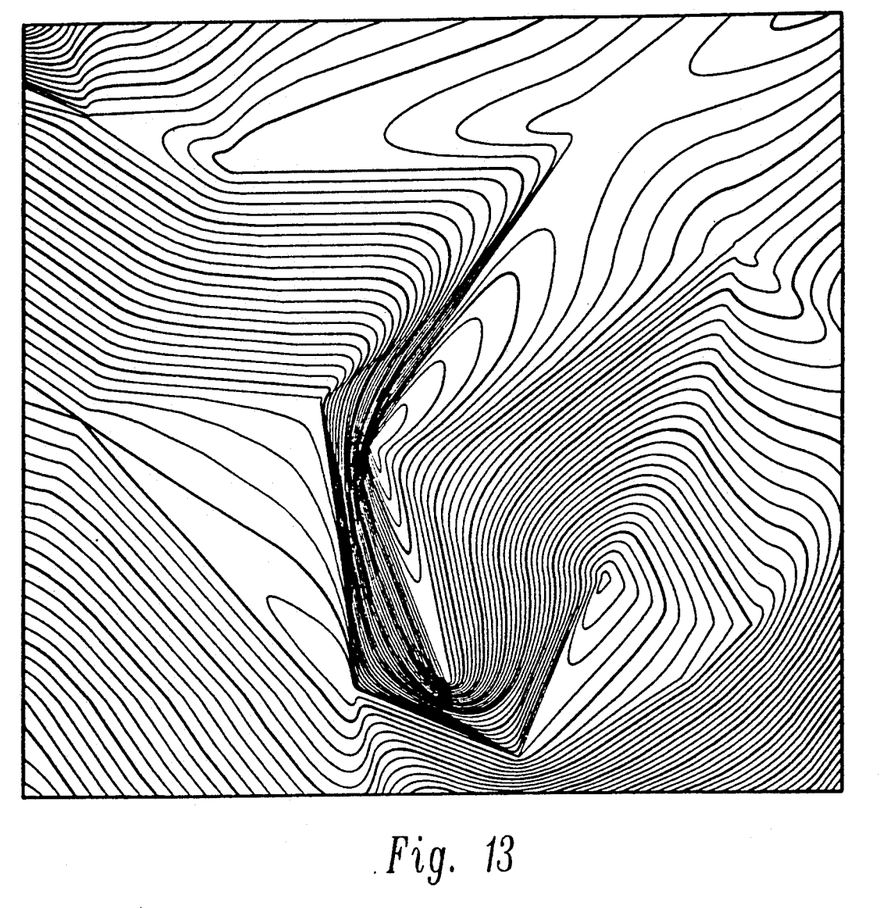
FIG. 13 depicts isolines of the triangular mesh in FIG. 1 smoothed in accordance with a preferred embodiment of the present invention.

As a result, a section of the isoline may be smoothed according to a preferred embodiment of the present invention. This process may be repeated for all of the sections of the isoline to produce a smooth isoline from the raw data. Referring now to FIG. 13, there is depicted isolines of the triangular mesh in FIG. 1 smoothed in accordance with a preferred embodiment of the present invention. Referring also to FIG. 3B, there is depicted a magnified center section of FIG. 13.

Thus, the shortcomings of the approaches presently available may be overcome in accordance with a preferred embodiment of the present invention. Additionally, the present invention provides smoothed isolines that accurately represent all of the source data elements of the surface being modeled. Moreover, the smoothed isolines never intersect, unless the surface has been modified to represent folds, overhangs or caverns, according to a preferred embodiment of the present invention.

Furthermore, in addition to the accurate presentation of data, no fantasies in the smooth curves occur utilizing a preferred embodiment of the present invention. Moreover, it should be possible to simply control the degree of smoothing of the isolines in accordance with a preferred embodiment of the present invention. Further, the process is capable of dealing with various configurations, and may detect and avoid singular triangle configurations, such as triangles with extremely acute angles and triangle edges exactly aligned.

Another advantage of the present invention is that the result of smoothing isolines is coherent with the result of smoothing the triangulation as a surface, i.e., 3D view of surface profiles, fishnet renderings, shaded relief representations. The present invention also allows for increases in processing time over the minimum set by raw contouring of the order of the number of extra points inserted by the smoothing process.

The disclosed solution was first thoroughly tested with synthetic surfaces. Some of them were randomly defined, while others were purposely designed with those features that are the pitfalls of the Line Interpolation approach. The solution was also tested with many real cases. Together with a graphic system and a complete package for generating triangulated surface models, the solution was tested without any errors after two months of tests.

In the case of FIGS. 10A and 10B, the line segments of the tangents approximating the two parabolic lines or arcs of parabols are: $A_1$-$F_1$; $F_1$-$F_2$; $F_2$-$F_3$; $F_3$-$F_4$; and $F_4$-$C_1$ for the first parabolic line and $C_1$-$F_5$; $F_5$-$F_6$; $F_6$-$F_7$; $F_7$-$F_8$; and $F_8$-$A_3$ for the second parabolic line. The ordered list of midpoints H of each line segment $F_i$-$F_{i+1}$ constitute the approximation to the two arcs. By construction, the parabolic lines are tangent to the original line $A_1$-$A_2$-$A_3$ at $A_1$ and $A_3$. Because all sections of the contour are smoothed the same way, the precedent and subsequent sections to $A_1$-$A_2$-$A_3$ are tangents to $A_1$-$A_2$ and $A_2$-$A_3$ at the same points $A_1$ and $A_3$. It follows then, that adjacent piecewise approximations have identical gradients at common points.

The fact that the number of tangents, in FIGS. 10A and 10B, approximating the two parabolic lines are equal is coincidental. All other parameters being equal, the number of tangents for one parabolic line depends on the configuration of the sub-triangle at the corresponding side of the edge under smoothing, and on the geometry of the section of isoline. Only if the two sub-triangles and the two halves of the section of raw isoline were mirror images with respect to the edge under smoothing would the approximations have the same number of tangents.

If a triangle edge is crossed by several isolines, it may be possible to verify that the points C (point $C_1$ for FIG. 10A) common to the pairs of parabolic approximations for each isoline are aligned on an arc. This arc diverges away from the edge. Such an arrangement seems to result in slightly better shaped isolines than those resulting from points C being exactly on the edge. Furthermore, a program implementing this may be simpler and the execution of such a program may be faster. The points C, however, when on the edge, define an easily computed vertical curve. With this advantage and the requirements of three-dimensional views in mind, such an option may be included in the above procedure, wherein instead of computing $C_1$ as: $C_1 = m(B_1-B_2)$ (See FIG. 10A), $B_1$-$B_2$ may be intersected with edge $P_1$-$P_3$, and the intersection taken as point $C_1$.

Although the depicted embodiment is especially directed towards contours in topographic maps, the present invention may be applied to any model utilizing isolines within a triangulation or a triangular mesh.

Although the depicted embodiment of the present invention replaces a raw isoline within two triangles in a triangular mesh with two parabolic lines, it is contemplated that other methods and systems for fitting curves to predefined points within the triangles well known by those of ordinary skill in the art may be utilized to replace the raw isoline.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for differentially smoothing isolines, wherein each isoline is comprised of a plurality of angular successions of linear segments within a triangular mesh representing a measurable feature of a physical object and wherein said triangular mesh comprises a plurality of non-overlapping triangles, said method comprising the data processing system implemented steps of:

locating a first centroid for a first triangle within said triangular mesh and a second centroid for a second triangle within said triangular mesh utilizing said data processing system, wherein said isolines within said triangular mesh are comprised of data produced by measuring said measurable feature of said physical object and wherein each centroid includes three medians, each median connecting said centroid with one of three vertices of a triangle associated with said centroid exclusive of said other two medians, wherein said first and second triangle have a common side, said common side having a first end point and a second end point, wherein an isoline traverses said first and said second triangle and traverses at least one of said three medians in each triangle;

determining a first point utilizing said data processing system, wherein said first point comprises an intersection of said isoline and a median within said first triangle;

determining a second point utilizing said data processing system, wherein said second point comprises an intersection of said isoline with a median within said second triangle;

determining a third point utilizing said data processing system, wherein said third point comprises an intersection of said isoline with said common side; and thereafter replacing said isoline located within a triangle formed by said first point, said second point, and said third point with a curve utilizing said data processing system, wherein smoothed isolines of said measurable feature of said physical object may be displayed to a viewer.

2. The method of claim 1, wherein said first point is chosen from an intersection of a median with said isoline within said first triangle, said median within said second triangle having an endpoint at either said first endpoint or said second endpoint and wherein said second point is chosen from an intersection of a median with said isoline within said second triangle, said median within said first triangle having an endpoint at said first endpoint or said second end point.

3. The method of claim 2, further comprising selecting a point for said curve within said triangle formed from said first point, said second point, and said third point.

4. The method of claim 3, wherein said curve replacing said isoline comprises a first parabolic line intersects said first point and said point and a second parabolic line intersects said second point and said second point to produce a smoothed isoline.

5. The method of claim 4, wherein a degree of smoothness for said curve is selected by moving said end points on said first segment and on said second segment.

6. The method of claim 3, wherein said point is selected along a segment having endpoints on a first segment between said first point and said third point and on a second segment between said second point and said third point.

7. The method of claim 6, wherein said curve passes through said first point, said second point, and said point.

8. The method of claim 1, wherein said curve intersects said first point and said second point.

9. The method of claim 1, wherein said curve contains two arcs of parabolas.

10. The method of claim 1, wherein said measurable feature is elevation and said physical object is the Earth.

11. A data processing system for differentially smoothing isolines, wherein each isoline is comprised of a plurality of angular successions of linear segments within a triangular mesh representing a measurable feature of a physical object and wherein said triangular mesh comprises a plurality of non-overlapping triangles, said data processing system comprising:

a microprocessor including:

locating means for locating a first centroid for a first triangle within said triangular mesh and a second centroid for a second triangle within said triangular mesh, wherein said isolines within said triangular mesh are comprised of data produced by measuring said measurable feature of said physical object and wherein each centroid includes three medians, each median connecting said centroid with one of three vertices of a triangle associated with said centroid exclusive of said other two medians, wherein said first and second triangle have a common side, said common side having a first end point and a second end point, wherein an isoline traverses said first and said second triangle and traverses at least one of said three medians in each triangle;

means for determining a first point, wherein said first point comprises an intersection of said isoline and a median within said first triangles;

means for determining a second point, wherein said second point comprises an intersection of said isoline with a median within said second triangle;

means for determining a third point, wherein said third point comprises an intersection of said isoline with said common side; and means for replacing said isoline located within a triangle formed by said first point, said second point, and said third point with a curve; and a video display terminal coupled to said microprocessor, wherein smoothed isolines of said measurable feature of said physical object may be displayed to a viewer.

12. The data processing system of claim 11, wherein said first point is chosen from an intersection of a median with said isoline within said first triangle, said median within said first triangle having an endpoint at either said first endpoint or said second endpoint and wherein said second point is chosen from an intersection of a median with said isoline within said second triangle, said median within said second triangle having an endpoint at said first endpoint or said second end point.

13. The data processing system of claim 12, further including means for selecting a point for said curve within said triangle formed from said first point, said second point, and said third point.

14. The data processing system claim 13, wherein said curve replacing said isoline comprises a first parabolic line intersects said first point and said point and a second parabolic line intersects said second point and said point to produce a smoothed isoline.

15. The data processing system of claim 13, wherein means for selecting a point includes means for selecting said point along a segment having endpoints on a first segment between said first point and said third point and on a second segment between said second point and said third point.

16. The data processing system of claim 15 further comprising means for selecting a degree of smoothness for said curve which includes moving said end points on said first segment and on said second segment.

17. The data processing system of claim 15, wherein said curve passes through said first point, said second point, and said point.

18. The data processing system of claim 11, wherein said curve intersects said first point and said second point.

19. The data processing system of claim 11, wherein said curve comprises two arcs of a parabolas.

20. The data processing system of claim 11, wherein said measurable feature is elevation and said physical object is the Earth.

* * * * *